United States Patent [19]
Diekert

[11] Patent Number: 5,259,472
[45] Date of Patent: Nov. 9, 1993

[54] CIRCUIT CONFIGURATION FOR DETECTING THE STEERING LOCK ANGLE OF THE REAR WHEELS OF A MOTOR VEHICLE

[75] Inventor: Thomas Diekert, Regensburg, Fed. Rep. of Germany

[73] Assignee: Siemens Aktiengesellschaft, Munich, Fed. Rep. of Germany

[21] Appl. No.: 805,583

[22] Filed: Dec. 11, 1991

[30] Foreign Application Priority Data

Dec. 12, 1990 [EP] European Pat. Off. ........ 90123944.2

[51] Int. Cl.⁵ .................... B62D 15/02; G01D 5/14
[52] U.S. Cl. ............................................ 180/79.1
[58] Field of Search .................. 180/79.1, 140, 141, 180/142

[56] References Cited

U.S. PATENT DOCUMENTS

| | | |
|---|---|---|
| 3,498,630 | 3/1970 | Crawford ................. 180/79.1 |
| 4,156,130 | 5/1979 | Ivashin et al. . |
| 4,803,420 | 2/1989 | Steinbrecher et al. . |
| 4,922,177 | 5/1990 | Mausner . |
| 4,953,650 | 9/1990 | Ohmura . |

FOREIGN PATENT DOCUMENTS

| | | | |
|---|---|---|---|
| 460664 | 12/1991 | European Pat. Off. ............ 180/140 |
| 3325400 | 2/1985 | Fed. Rep. of Germany . |
| 3730926 | 3/1989 | Fed. Rep. of Germany ..... 180/79.1 |
| 119529 | 10/1978 | Japan .................. 180/79.1 |
| 58-221771 | 12/1983 | Japan . |
| 109461 | 6/1984 | Japan .................. 180/79.1 |
| 45274 | 2/1990 | Japan .................. 180/79.1 |

Primary Examiner—Mitchell J. Hill

[57] ABSTRACT

A motor vehicle has rear wheels being steered with the aid of a drive and an adjusting piston. A circuit configuration for detecting a steering lock angle of the rear wheels includes a first potentiometer detecting a displacement of the adjusting piston. The first potentiometer has a setting contact and electric terminals. A second potentiometer has a setting contact being moved as a function of the wheel steering lock and it has electric terminals. Two resistors are each connected in series with a respective one of the potentiometers. An evaluation circuit in which the steering lock angle is determined, is connected to the electric terminals and the setting contacts.

5 Claims, 2 Drawing Sheets

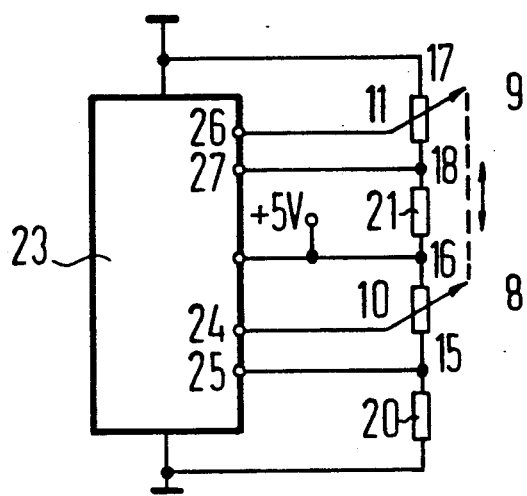
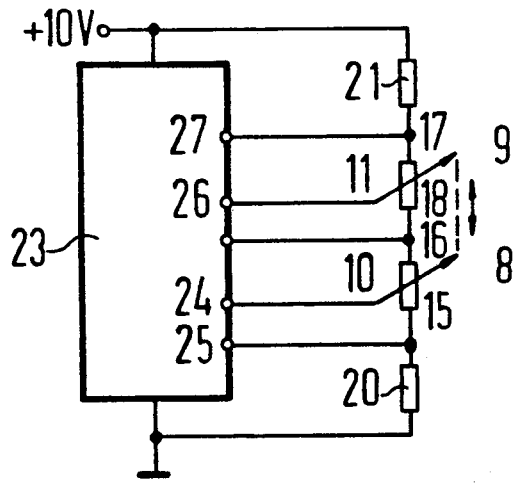

CIRCUIT CONFIGURATION FOR DETECTING THE STEERING LOCK ANGLE OF THE REAR WHEELS OF A MOTOR VEHICLE

BACKGROUND OF THE INVENTION

1. Field of the Invention

The invention relates to a circuit configurationfor detecting the steering lock angle of rear wheels of a motor vehicle which are steered with the aid of a drive and an adjusting piston, including a potentiometer for detecting the displacement of the adjusting piston.

2. Description of the Related Art

German Published, Non-Prosecuted Application DE-OS 39 08 164, corresponding to U.S. Pat. No. 4,953,650, describes a control system for the rear wheel steering of a motor vehicle, in which a drive motor drives an adjusting piston that is mechanically coupled to the rear wheels and serves to steer the rear wheels. A potentiometer is used to detect the displacement of the adjusting piston. The command value for the steering lock angle of the rear wheels depends on the steering lock angle of the front wheels, taking vehicle speed into account. Steering of the rear wheels takes place only whenever the signals of sensors used to detect the steering lock angle of the front wheels and of the steering wheel, and sensors used for detecting the vehicle speed, substantially match one another. Several pieces of information from sensors must be evaluated and compared with one another.

However, if the rear wheels are steered, it is important to detect the steering lock angle quickly and without error, because otherwise the situation may become critical in terms of safety. Nevertheless, it has been found that the known control system does not detect the steering lock angle of the rear wheels fast enough.

It is accordingly an object of the invention to provide a circuit configuration for detecting the steering lock angle of the rear wheels of a motor vehicle, which overcomes the hereinafore-mentioned disadvantages of the heretofore-known devices of this general type and which detects the steering lock angle of the steered rear wheels quickly and without error.

SUMMARY OF THE INVENTION

With the foregoing and other objects in view there is provided, in accordance with the invention, in a motor vehicle having rear wheels being steered with the aid of a drive and an adjusting piston, a circuit configuration for detecting a steering lock angle of the rear wheels, comprising a first potentiometer detecting a displacement of the adjusting piston, the first potentiometer having a setting contact and having electric terminals; a second potentiometer having a setting contact being moved as a function of the wheel steering lock and having electric terminals; two resistors each being connected in series with a respective one of the potentiometers; and an evaluation circuit in which the steering lock angle is determined, the electric terminals and the setting contacts being connected to the evaluation circuit.

As a result of the invention, a circuit configuration is obtained that is simple in structure and yet functions reliably and moreover is favorable in cost.

In accordance with another feature of the invention, the setting contacts are mechanically coupled to one another.

In accordance with a further feature of the invention, the evaluation circuit picks up signals between the resistors and the potentiometers for recognizing errors when the steering lock angle is detected.

In accordance with an added feature of the invention, the evaluation circuit determines the steering lock angle from potentials at the setting contacts and the terminals, and recognizes whether or not an error has occurred within a measurement procedure.

In accordance with a concomitant feature of the invention, the setting contacts are secured to the adjusting piston.

Other features which are considered as characteristic for the invention are set forth in the appended claims.

Although the invention is illustrated and described herein as embodied in a circuit configuration for detecting the steering lock angle of the rear wheels of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a schematic circuit diagram of a configuration according to the invention for detecting the steering lock angle of the steered rear wheels; and FIG. 4 is a view similar to FIG. 3 of a further circuit configuration for detecting the steering lock angle.

DESCRIPTION OF THE PREFERRED EMBODIMENTS

Figure 1:
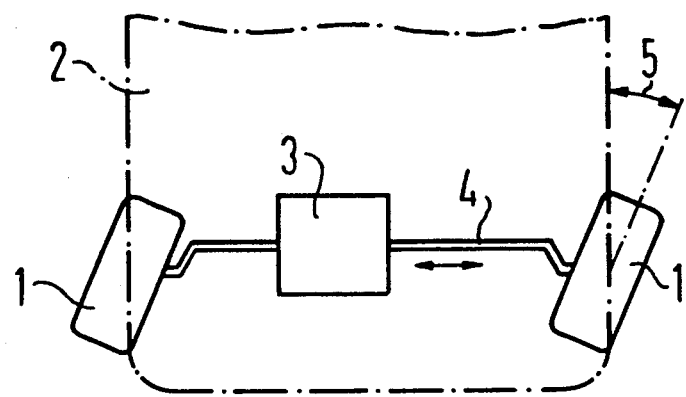
FIG. 1 is a fragmentary, plan of an apparatus for steering rear wheels of a motor vehicle.

Referring now to the figures of the drawing in detail and first, particularly, to FIG. 1 thereof, there are seen rear wheels 1 of a motor vehicle 2 which are steered with the aid of a final control element 3 and an adjusting rod 4. The adjusting rod 4 is mechanically coupled to the rear wheels 1. If the adjusting rod 4 is moved back and forth in the direction of an arrow, the rear wheels 1 are turned by a corresponding angle with respect to the straight-ahead direction. This angle is referred to herein as a steering lock angle 5.

Figure 2:
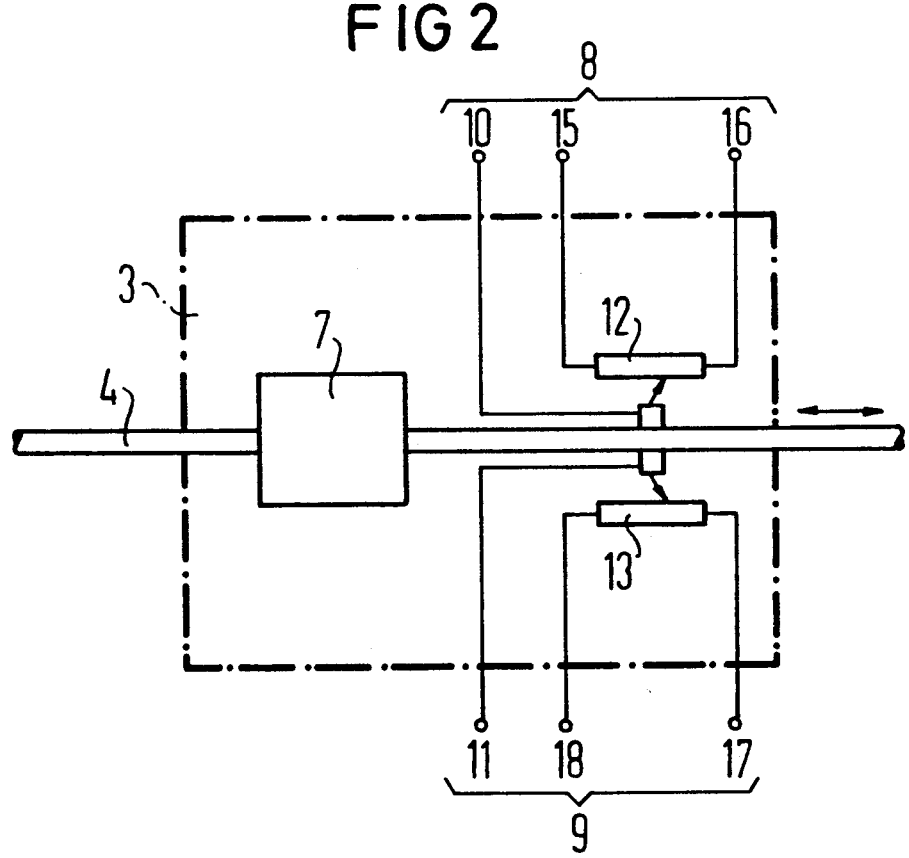
FIG. 2 is a schematic and diagrammatic view of a final control element of the apparatus of FIG. 1.

The final control element 3 seen in FIG. 2 has a drive 7 and first and second potentiometers 8 and 9, each of which have a respective setting contact 10 and 11, a resistor film 12 and 13, and respective electric terminals 15, 16 and 17, 18. The adjusting rod 4 is moved by the drive 7, which is triggered by a control unit that is not, shown in FIG. 2. The drive 7 of the adjusting rod 4 may be operated hydraulically or electrically, for example.

The setting contacts 10 and 11 are secured to the adjusting rod 4. When the adjusting rod 4 is displaced, the setting contacts 10 and 11 move through the resistor films 12 and 13, which do not move in their position with respect to the adjusting rod. In this process, the setting contacts 10 and 11 pickup a voltage, which corresponds to the displacement path traveled and thus to the steering lock angle 5 of the rear wheels 1.

A circuit configuration shown in FIG. 3 for detecting the steering lock angle 5 of the rear wheels 1 has the two potentiometers 8 and 9, two resistors 20 and 21, and an evaluation circuit 23 having inputs 24, 25, 26 and 27. The respective resistors 20 and 21 and potentiometers 8 and 9, are each connected in series with one another.

A broken line 22 in FIG. 3 represents a mechanical connection between the two setting contacts 10 and 11, which is provided by means of the adjusting rod 4. In other words, the two setting contacts 10 and 11 are rigidly coupled to one another mechanically.

The voltage picked up by the setting contacts 10 and 11 is carried to the respective inputs 24 and 26. The displacement of the adjusting rod 4 can be calculated from these voltages alone. In order to enable recognition of any errors that may occur in the measurement, the terminal 15 is connected to the input 25 and the terminal 18 is connected to the input 27, and all of the input voltages of the inputs 24, 25, 26 and 27 are used in the evaluation circuit 23 for determining the displacement travel and thus the steering lock angle 5.

The resistor 20 is located between the potentiometer 8 and ground, and the resistor 21 is located between the potentiometer 9 and +5 V. As a result, the voltages picked up at the setting contacts 10 and 11 are at different potentials.

In the evaluation circuit 23, a first displacement path is ascertained from the input voltages at the inputs 24 and 25, and a second displacement path is ascertained from the input voltages at the inputs 26 and 27, with the aid of a computing instruction.

If no error occurs in the measurement of the displacement of the adjusting rod 4, then both calculated displacement paths are of equal length. Due to component tolerances, the two values may fluctuate by a command value within a tolerance range.

However, if a measurement error does occur in the circuit configuration, which is caused, for instance, by a short circuit between the setting contact 10 and the terminal 15 or by a break in an electrical connection, then the two calculated displacement paths will differ considerably. This difference is immediately recognized by the evaluation circuit 23.

If the two calculated displacement paths differ by more than the tolerance range, then the control unit holds the rear wheels 1 in the instantaneous position, and only the front wheels are steered, as in a vehicle having purely front-wheel steering.

FIG. 4 shows a further exemplary embodiment of the invention. Elements that are the same as in FIG. 3 have the same reference numerals. The series circuit of the resistors 20 and 21 with the potentiometers 8 and 9 is connected to +10 V on one end and to ground on the other. If the resistances of the potentiometers 8 and 9 and of the resistors 20 and 21 are of equal magnitude, then the constant voltage of +5 V is present in the middle. A voltage of less than +5 V can be picked up at the setting contact 10 and the terminal 15, and a voltage which is greater than +5 V can be picked up at the setting contact 11 and the terminal 17, in the error-free situation.

Due to the different voltage ranges, simpler error diagnosis is possible in the event of error. An accurate statement can be made as to whether an error has occurred in the potentiometer 8 or 9. This exemplary embodiment can be used if a voltage that is greater than +5 V is used as a supply voltage for the evaluation circuit 23.

In both exemplary embodiments, the resistances of the resistors 20 and 21 are of equal magnitude, at approximately 600 Ohms. The resistor films 12 and 13 are also of equal size and have a resistance of approximately 2.5 kOhms. A microprocessor can, for instance, be used as the evaluation circuit 23.

I claim:

1. In a motor vehicle having rear wheels being steered with the aid of a drive and an adjusting rod, a circuit configuration for detecting a steering lock angle of the rear wheels, comprising:
   a first potentiometer detecting a displacement of the adjusting rod, said first potentiometer having a setting contact and electric terminals;
   a second potentiometer having a setting contact being moved as a function of the steering lock angle and electric terminals;
   a first resistor connected in series with said first potentiometer and a second resistor connected in series with said second potentiometer; and
   an evaluation circuit in which the steering lock angle is determined, said electric terminals of each of said first and second potentiometers and said setting contact of each of said first and second potentiometers being connected to said evaluation circuit.

2. The circuit configuration according to claim 1, wherein said setting contact of said first potentiometer and said setting contact of said second potentiometer are mechanically coupled to one another.

3. The circuit configuration according to claim 2, wherein said evaluation circuit is connected between said first resistor and said first potentiometer and between said second resistor and said second potentiometer for recognizing errors when the steering lock angle is detected.

4. The circuit configuration according to claim 3, wherein said evaluation circuit determines the steering lock angle from potentials at said setting contact of each of said first and second potentiometer and said electric terminals, and recognizes whether or not an error has occurred.

5. The circuit configuration according to claim 4, wherein said setting contacts are secured to the adjusting rod provided for steering the rear wheels.

* * * * *